2,717,897

PROCESS FOR MAKING SUBSTITUTED PYRIDINES

Jesse T. Dunn, Charleston, W. Va., assignor to Union Carbide and Carbon Corporation, a corporation of New York No Drawing. Application March 28, 1951,
Serial No. 218,063

1 Claim. (Cl. 260—290)

This invention relates to an improved process for making 2-methyl-5-ethylpyridine by the reaction of acetaldehyde with ammonia.

The condensation of aldehydes with ammonia to form substituted pyridines, although one of the oldest of organic reactions, has generally had a poor reputation as a method of synthesis because of the formation of mixtures of pyridines and various by-products. Frank and Seven, J. Am. Chem. Soc. v. 71, pp. 2629–35 (1949), who have recently investigated this reaction, known as the Chichibabin synthesis, were able to obtain higher yields of single products in certain instances by the use of an excess of aqueous ammonia. However, these investigators were able to obtain an improved yield (57.5%–59.5%) of 2-methyl-5-ethylpyridine (aldehydecollidine) by their method only when a derivative of acetaldehyde, such as acetal or paraldehyde, was employed, and their yield under the same conditions using acetaldehyde was much lower (34%).

For industrial purposes, it would be desirable to use acetaldehyde as the starting material because it is less expensive than one of its derivatives. Accordingly, the object of the present invention is to improve the yield of 2-methyl-5-ethylpyridine when acetaldehyde is reacted with ammonia.

It has been found that this object may be achieved by maintaining a low concentration of acetaldehyde in the reaction mixture at all times. The previous investigators, while they have recognized that it is desirable to use a high ratio of ammonia to acetaldehyde, have charged all the acetaldehyde together with the ammonia to a pressure vessel and then heated the contents to about 250° C. It has now been found that this procedure leads to side reactions of the acetaldehyde and consequently low yields of the desired 2-methyl-5-ethylpyridine result. By the method of this invention, aqueous ammonia is charged to a pressure vessel and heated to reaction temperature. Acetaldehyde is then introduced under pressure to the reaction vessel at such a rate as to maintain a low concentration of unreacted acetaldeyhde in the vessel. By following this practice, the principal reaction which occurs is between acetaldehyde and ammonia to form 2-methyl-5-ethylpyridine according to the following scheme:

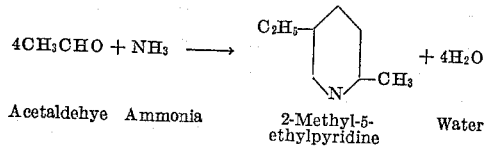

| $4CH_3CHO + NH_3 \longrightarrow$ | [2-Methyl-5-ethylpyridine structure] | $+ 4H_2O$ |
|---|---|---|
| Acetaldehye Ammonia | 2-Methyl-5-ethylpyridine | Water |

As the rate of this reaction is dependent upon the reaction temperature, the rate at which the acetaldehyde is fed will depend on the reaction temperature selected. At reaction temperatures of 250° C. to 260° C., the time required for addition of the acetaldehyde is about 15 to 30 minutes; whereas at a reaction temperature of 180° C., the time required for this addition is 2 to 3 hours. The reaction temperature also affects the yield of the pyridine obtained. Thus, at the lower reaction temperature of 180° C., the yield of 2-methyl-5-ethylpyridine was 48% to 50%; at reaction temperatures of 250° to 260° C. the yield was 54% to 56%, but at reaction temperatures of 275° to 300° C. the yield decreased below 54%.

Although the slow introduction of aldehyde to the heated charge of ammonia is essential to obtain a good yield of 2-methyl-5-ethylpyridine when acetaldehyde is employed as the reactant, the reaction will not necessarily be completed when all the acetaldehyde has been added. It is desirable therefore to continue heating the reactants, frequently at a slightly higher temperature. The length of this heating period will again be dependent on the reaction temperature selected, and it will be longer at the lower reaction temperatures. However, during this final period of heating, there will be only a low concentration of acetaldehyde present because most of the aldehyde will have reacted during the addition period. Thus the side reactions leading to low yields of 2-methyl-5-ethylpyridine, which occur when all the acetaldehyde is added at once to the ammonia and the charge thereafter heated, are largely eliminated.

The yield of 2-methyl-5-ethylpyridine is also increased by diluting the reactants with aqueous ammonia in excess of the equivalent amount. Thus, at a molar ratio of 0.8 moles of ammonia to 1.0 mole of acetaldehyde (3.2 times the theoretical amount), the yield was 55%, whereas when this ratio was increased to 2.5 to 1 (10 times the theoretical amount) the yield increased to almost 70%. Lower molar ratios of ammonia to acetaldehyde than 0.8 to 1.0, correspondingly, gave lower yields of products. When operating on an industrial scale, however, it is convenient to suffer some sacrifice in yield by using a more moderate excess of aqueous ammonia in order to avoid the necessity for the larger pressure vessels which are required to handle the larger volumes of aqueous ammonia.

As indicated above, the reaction is carried out under pressure. The initial pressure will be the vapor pressure of the aqueous ammonia solution at the reaction temperature, and at constant reaction temperature this pressure will normally decline somewhat as the acetaldehyde is fed to the pressure vessel, and the reaction progresses.

As is known, the yields of pyridines in the Chichibabin synthesis are increased by the presence of catalysts but catalysts are not required for the reaction to occur. The use of such catalysts is also beneficial when the synthesis is carried out under the conditions of this invention. Among the suitable catalysts are ammonium acetate or ammonium salts of other carboxylic acids, ammonium carbonate, ammonium chloride and sodium acetate.

The recovery of the 2-methyl-5-ethylpyridine is a relatively simple procedure, as the organic layer containing the product separates from the aqueous ammonia layer. If desired, the degree of separation can be increased by extracting the aqueous layer with a solvent, such as benzene or chloroform. Upon distillation, the product can be recovered in a pure state. The physical constants determined on the purest samples were: B. P. 43–44°/6 mm., 74–75°/20 mm., $n_D^{20}$, 1.4970; and sp. gr. at 20° C., 0.920.

The following example will illustrate the practice of the invention:

Example

Acetaldehyde (264 g., 6.0 moles) was pumped into a one-liter autoclave in which a solution of aqueous ammonia (292 g. solution, 5.4 moles NH₃) and ammonium acetate (7 g.) was being stirred at about 225° C. The pressure decreased from 960 p. s. i. to 650 p. s. i. during the hour the addition was being made. The temperature was then increased to 250° C. for 30 minutes. The products from two such experiments were combined and the organic layer was separated from the aqueous layer with the aid of chloroform as a solvent. Upon distillation of the organic layer, the total 2-methyl-5-ethylpyridine recovered from the two experiments amounted to 195 g. This corresponds to a yield of about 54% based on acetaldehyde fed. The purity of the main fraction (B. P. 74–75°/20 mm.) was about 100% by titration with acid. The residue weighed 121 g.

What is claimed is:

In the process of making 2-methyl-5-ethylpyridine by the reaction of acetaldehyde with ammonia, the improvements which comprise charging a quantity of aqueous ammonia to a pressure vessel substantially in excess of the equivalent amount, heating the charge of aqueous ammonia to a reaction temperature of about 180° C. to about 300° C., thereafter slowly adding acetaldehyde at a rate dependent on the reaction temperature so as to maintain a low concentration of unreacted acetaldehyde in the vessel, and after the addition of the acetaldehyde holding the vessel at the reaction temperature until the reaction is completed.

References Cited in the file of this patent

UNITED STATES PATENTS

| 2,615,022 | Mahan | Oct. 21, 1952 |

FOREIGN PATENTS

| 332,623 | Great Britain | 1929 |
| 521,891 | France | 1921 |
| 534,494 | Great Britain | 1941 |

OTHER REFERENCES

Frank, JACS, July 1946, pp. 1368 and 1369.